US010250112B2

(12) United States Patent
Radovsky

(10) Patent No.: US 10,250,112 B2
(45) Date of Patent: Apr. 2, 2019

(54) TRANSVERSE FLUX MACHINE

(71) Applicant: EKORAD LTD., Petach Tikva (IL)

(72) Inventor: Alexander Radovsky, Zichron Ya'akov (IL)

(73) Assignee: EKORAD LTD., Petach Tikva (IL)

( * ) Notice: Subject to any disclaimer, the term of this patent is extended or adjusted under 35 U.S.C. 154(b) by 229 days.

(21) Appl. No.: 14/917,965

(22) PCT Filed: Oct. 14, 2014

(86) PCT No.: PCT/IL2014/050901
§ 371 (c)(1),
(2) Date: Mar. 10, 2016

(87) PCT Pub. No.: WO2015/056268
PCT Pub. Date: Apr. 23, 2015

(65) Prior Publication Data
US 2016/0218606 A1    Jul. 28, 2016

Related U.S. Application Data

(60) Provisional application No. 61/890,871, filed on Oct. 14, 2013.

(51) Int. Cl.
*H02K 19/06*    (2006.01)
*H02K 21/12*    (2006.01)
(Continued)

(52) U.S. Cl.
CPC ............ *H02K 19/06* (2013.01); *H02K 1/145* (2013.01); *H02K 1/18* (2013.01); *H02K 1/185* (2013.01);
(Continued)

(58) Field of Classification Search
CPC ........ H02K 19/06; H02K 1/145; H02K 1/185; H02K 1/18; H02K 1/187; H02K 1/246;
(Continued)

(56) References Cited

U.S. PATENT DOCUMENTS 5,422,530 A * 6/1995 Nolle ..................... H02K 1/16
                                                       310/257
6,097,118 A    8/2000 Hull
(Continued)

FOREIGN PATENT DOCUMENTS

CN        101577449           11/2009
CN        101577449 A         11/2009
(Continued)

OTHER PUBLICATIONS

Chinese Office Action Application No. 201480056712.3 dated Aug. 9, 2017 5 pages.
(Continued)

*Primary Examiner* — Forrest M Phillips
(74) *Attorney, Agent, or Firm* — The Roy Gross Law Firm, LLC; Roy Gross

(57) ABSTRACT

The invention implements a variation of the electrical transverse flux machine (motor or generator) that employs ferromagnetic excitation elements mostly located on the stator rather on the rotor. The excitation elements are employed in nearly-complete magnetic circuits that are periodically completed by the movement of the rotor. The varying flux that is thus generated is used to cause an EMF in windings, for the case of generators, or for the case of motors, appropriate EMF is used to cause varying flux that in turn causes rotation of the motor.

10 Claims, 4 Drawing Sheets

(51) Int. Cl.
*H02K 1/18* (2006.01)
*H02K 1/24* (2006.01)
*H02K 21/44* (2006.01)
*H02K 1/14* (2006.01)
*H02K 21/24* (2006.01)

(52) U.S. Cl.
CPC ............ *H02K 1/187* (2013.01); *H02K 1/246* (2013.01); *H02K 21/125* (2013.01); *H02K 21/44* (2013.01); *H02K 21/24* (2013.01); *H02K 2201/12* (2013.01)

(58) Field of Classification Search
CPC ........ H02K 1/125; H02K 21/44; H02K 21/24; H02K 2201/12
USPC .............................................. 310/46, 216.001
See application file for complete search history.

(56) References Cited

U.S. PATENT DOCUMENTS

| | | | | |
|---|---|---|---|---|
| 8,040,011 B2 * | 10/2011 | Mueller | .............. | F03B 13/1845 310/156.64 |
| 2010/0141061 A1 * | 6/2010 | Ramu | ...................... | H02K 1/14 310/46 |
| 2013/0113320 A1 * | 5/2013 | Calley | .................. | H02K 21/145 310/156.02 |
| 2013/0154397 A1 * | 6/2013 | Sullivan | ................. | H02K 21/00 310/12.18 |

FOREIGN PATENT DOCUMENTS

| | | |
|---|---|---|
| CN | 201378789 Y | 1/2010 |
| CN | 101741197 | 6/2010 |
| CN | 101741197 A | 6/2010 |
| CN | 102013785 | 4/2011 |
| CN | 103199669 | 7/2013 |
| DE | 3705089 | 8/1988 |
| DE | 3705089 A1 | 8/1988 |
| DE | 4443999 | 4/1996 |
| DE | 4443999 C1 | 4/1996 |
| DE | 102011084580 A1 | 4/2013 |
| WO | 2009057916 A2 | 5/2009 |
| WO | WO2009057916 | 5/2009 |

OTHER PUBLICATIONS

Japanese Office Action Application No. 2016-547253 4 pages.
International Search Report of PCT/IL2014/050901 Completed Feb. 19, 2015; dated Feb. 19, 2015 6 Pages.
Written Opinion of ISR of PCT/IL2014/050901 Completed Feb. 19, 2015; dated Feb. 19, 2015 6 Pages.
International Preliminary Report on Patentability of PCT/IL2014/050901 Completed Jan. 19, 2016 21 Pages.
European Search Report of 14853534.7—PCT/IL2014/050901 Completed Jan. 30, 2017 9 Pages.
Japanese Search Report 2016-547253 4 Pages.
Chinese Office Action dated Jun. 6, 2018 for Application No. 201480056712.3, 13 pages.
European Search Report, App. No. 14 853 534.7-1201, dated Dec. 18, 2018, 7 pages.

* cited by examiner

TRANSVERSE FLUX MACHINE

FIELD OF THE INVENTION

The present invention relates to the field of energy conversion devices, specifically brushless electric motors and generators.

BACKGROUND OF THE INVENTION

The Transverse Flux Machine (hereinafter TFM), originally patented more than a century ago, has recently attracted renewed attention with the availability of high-energy permanent magnetic material. A TFM utilizes a magnetic circuit perpendicular to the direction of motion. TFM offers a higher specific torque and power density than a conventional radial flux machine. However, few substantial drawbacks cause performance problems that prevent TFM from taking the lead of electrical machines' market:
1. Low power factor: due to relatively low magnetic resistance to leakage fluxes and high parasite fluxes due to usually minimal distance between magnets, reducing the working flux.
2. Power density limit: Power density of brushless electric motors and generators is often of importance, since smaller and lighter devices will generally be more useful in many applications as well as often saving expensive magnetic, ferrous, and conductive materials. Most of the TFM designs involve magnets mounted on the outer surface of the rotor, thus suffering from centrifugal and magnetic traction forces that limit the machine's speed in order to maintain rotor integrity. As will be known to one skilled in the art, the power density of electric motors and generators including the TFM is related to the RPM of the device since the effectiveness is greater at higher RPM.
3. High complexity of the design: increasing production costs and negatively affecting reliability. Fully 3-dimensional configurations require more complex analyses than those often undertaken for other electromagnetic machines, making their design more involved.

There thus remains a long-felt need for improved energy conversion devices based on the TFM, allowing for better performance, namely higher power factor and power densities and compatibility for increased RPM.

SUMMARY OF THE INVENTION

The current invention implements a variation of TFM overvoming the characteristic disadvantages and enabling bringing this technology to its full potential. We call this invention the 'Improved Transverse Flux Machine', hereinafter ITFM. The device employs magnetic excitation elements in nearly-complete magnetic circuits that are periodically completed by the movement of the rotor. The varying flux that is thus generated is used to cause an EMF in windings, for the case of generators, or for the case of motors, appropriate voltage is used to cause varying flux to cause rotation of the motor.

The ITFM uses passive ferromagnetic (or otherwise magnetically permeable) elements serving as magnetic flux distribution switches which turn the direct excitation magnetic flux (e.g. by 90° to different directions (e.g. left/right,) periodically around each of the two phase half-windings, one after another.

This role enables the mostly unique and surprising feature of constant utilization of all of the magnetic excitation elements, making the present ITFM design revolutionary.

In other TFM designs, such as in US 2013/0113320(A1) the TFM utilizes only half of the magnet at every given working moment, and the other half is idle, while the ITFM design of the present invention is comprised of the flux distribution switches and two-halved phase winding that enable constant utilization of all of the magnets: At any given time the flux distribution switches interacting with the two adjacent magnets of different polarities, face them in a manner that one distribution switch receives the flux from the north pole and the other distribution switch receives the flux from the south pole, directing their flux around one of the phase half-windings. After a rotor rotation of one pole pitch, the distribution switch that interacted with the north pole, will interact with the south, and the one that interacted with the south pole will interact with the north.

Thus, the EMF is simultaneously induced in each half-winding, and they can be connected either in series or in parallel.

BRIEF DESCRIPTION OF THE DRAWINGS

Embodiments and features of the present invention are described herein in conjunction with the following drawings.

DETAILED DESCRIPTION OF THE PREFERRED EMBODIMENTS

The present invention will be understood from the following detailed description of preferred embodiments, which are meant to be descriptive and not limiting. For the sake of brevity, some well-known features, methods, systems, procedures, components, circuits, and so on, are not described in detail.

Transverse Flux Machine concept (hereinafter TFM), currently enjoys a renaissance of interest with the advent of high energy-product permanent magnet materials.

Figure 1:
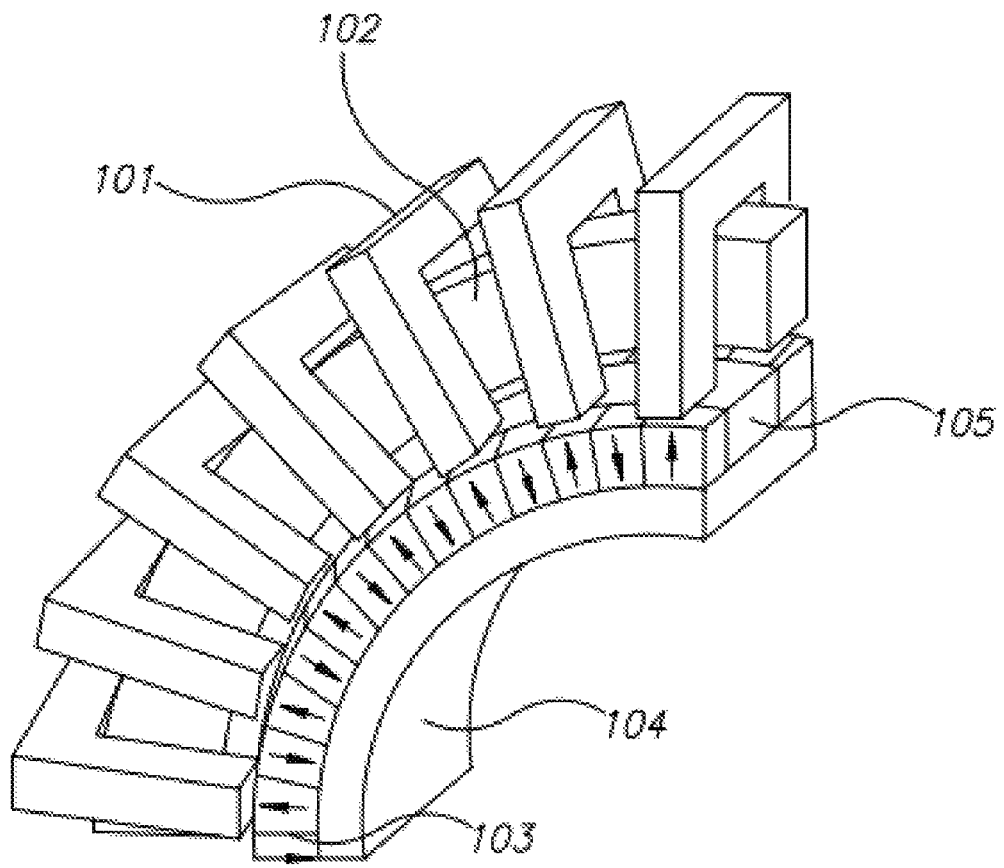
FIG. 1 depicts a TFM of prior art.

FIG. 1 shows a traditional TFM with C-core ferromagnetic stator cores 101, ring-shaped stator winding 102, rotor permanent magnets 103, and ferromagnetic rotor core 104. As will be clear to one skilled in the art, rotation of the rotor will cause periodic flux in the flux cores 101 due to the completion of flux circuits by the permanent magnets 103 and ferromagnetic flux linkage segments 105. As should be apparent from the figure, the stator cores 101 surround the stator winding 102 on three sides. The fourth side is completed on the rotor, by means of rotor ferromagnetic segments 105. Similarly, motor operation is possible if more than one stator windings are used. It should be clear that holding magnets on the rotor in a reliable manner is very challenging.

The current invention is a variant of the TFM which we call the 'Improved Transverse Flux Machine' or ITFM. The device employs magnetic excitation elements in nearly-complete magnetic circuits that are periodically completed by the movement of the rotor. The ITFM uses magnetic flux distribution switch elements to complete circuits having changing flux directions, allowing the magnets to be used for excitation without idle or inactive time, and ultimately resulting in greater power density or reduction in magnetic material required.

The term 'magnetic flux distribution switch' hereinafter refers to a passive ferromagnetic (or otherwise magnetically permeable) element that periodically changes the direction of magnetic flux through a section of a closed or nearly closed circuit of magnetically permeable material.

Figure 2:
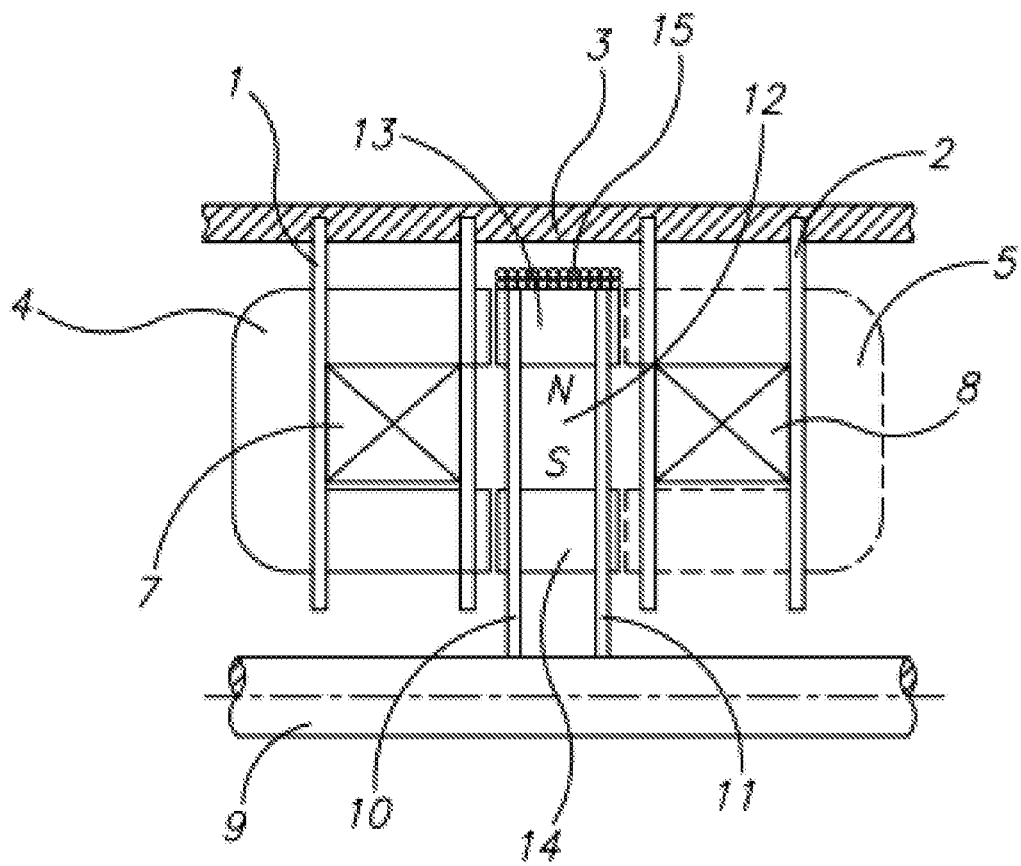
FIG. 2 shows an embodiment employing disc rotor.

For example, in FIG. 2 passive ferromagnetic axial distribution switches 13, 14, are magnetically coupled to permanent magnet 12, all on a rotating rotor 9. These distribution switches change the direction of the magnetic flux of the permanent magnet by 90° to the right set of C-cores or to the left set of C-cores, periodically during the rotation of rotor.

Such an arrangement for effective reversal of magnetic flux is what we refer to as a "passive ferromagnetic magnetic flux distribution switch".

Advantages

Before exploring the embodiments we list a number of advantages of the inventive concept.
1. Constant utilization of all of the magnetic excitation elements: making the present ITFM design revolutionary.
2. High Power Factor: Significant advantage of all of IFTM embodiments is reduced (self-induction) leakage fluxes. The magnetic resistance to leakage fluxes is higher because the air parts of the leakage flux trajectory are bigger than in regular TFM designs. This will tend to reduce reactance and improve power factor.
3. High RPM compatibility: Most of the common TFM designs have their magnets mounted on the outer surface of the rotor, and suffer from technological challenge to maintain rotor integrity under high speeds, due to the centrifugal forces and magnetic traction forces on the magnets.
   However, the ITFM overcomes this limitation. In two embodiments of the current invention, E and L, the magnets are arranged on the stator as opposed to the rotor (making the implementation of a reliable design easier as there are no centrifugal forces on the magnets in addition to the inevitable magnetic forces). In the Disc Rotor embodiment, although the radial magnets are on the rotor, there is no technological challenge to withstand centrifuagal forces and assure rotor integrity, (e.g. using Kevlar bands).
4. Reduction in copper: The current invention can use less copper in the windings due to reduced parasite fluxes. Unlike conventional TFM designs, ITFM magnets with opposite polarity are arranged relatively far from each other making significant leakage of magnetic flux less dire than in the case of TFM rotor-based magnets (where the spacing is generally closer and parasite flux greater), thus having greater useful flux, allowing economy in copper.

INVENTION EMBODIMENTS

The invention can be implemented in a variety of configurations, including magnetic flux distribution switches having the form of rectangle or L shaped laminated steel stacks, stator cores having forms such as E, I, T, C, and different rotor configurations.

Some leading possible variations are listed as follows:

1. Disc Rotor Embodiment

FIG. 2 depicts an example of the invention.

Bobbins 1,2 are used for winding holding, for cores distribution and for torque passing from stator cores to housing drum.

The stator comprises two bobbins 1,2 rigidly connected to stator frame 3, which hold C-cores 4,5. As shown, the legs of the cores are oriented axially and face each other.

The sets of C-cores 4 and 5 are shifted by one angular pole pitch. If several phases are used, the different phase modules are shifted relative to one another at a corresponding angle, for instance 120 electrical degrees in the case of a three-phase electrical machine.

The rotor shaft 9 holds two parallel discs 10,11 that hold the radial magnetic excitation elements (e.g. permanent magnets 12). These will alternate polarity, and are provided with magnetically permeable material such as laminated steel stacks 13 and 14 acting as axial 'magentic flux distribution switches' (insofar as the flux through them will sometimes point towards the left and sometimes to the right, depending on which side the closest C-core is). With every rotation of the rotor through one angular pole pitch, the direction of magnetic fluxes in the distribution switch elements 13,14 is reversed.

The magnets 12 may in number be twice the number of the C-cores of one bobbin.

Centrifugal forces exerted on the disc housing may be dealt with for instance by use of a band 15 made of suitable high-modulus material such as Kevlar.

During rotation of the rotor, an EMF is induced in the phase half-windings 7,8 of the 170 device, allowing for the device to be used as a generator. Similarly the device may be used as a motor with appropriate control over the current in the windings.

3. E-Core Embodiment

Figure 3:
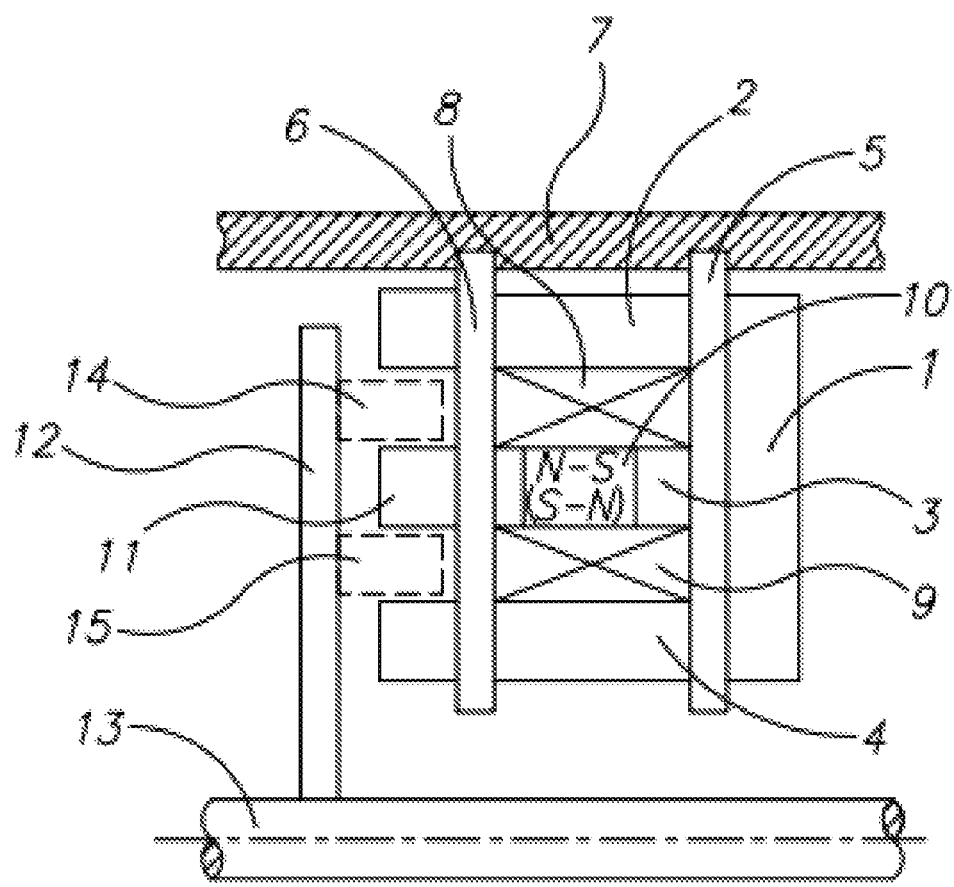
FIG. 3 shows an embodiment employing E-cores.

An E-core embodiment as shown in FIG. 3 is implemented as follows: the stator has phase elements comprising a number 2p of cores 1 taking the form of an E (E-cores). These are distributed evenly around a circle, and legs 2,3,4 of the core are parallel to the axis of revolution.

With the three legs of the E-core in this configuration, in the stator there are an even number of E cores 1 in the form of each with legs 2,3,4. The core comprises laminations of transformer steel. The middle leg 3 comprises a permanent magnet 10. The legs of the cores are fit into grooves into discs 5,6. The magnets are disposed with alternating polarity. A housing 7 on the two insulating discs 5,6 are affixed to the envelope, holding phase half-winding 8 between legs 2,3. Half-winding 9 is affixed between legs 3,4. At the end of the magnet affixed to leg 3 there is a rectangular radial distribution switch 11 of preferably laminated transformer steel. The shaft 13 of the rotor preferably includes disc 12 that prevents eddy currents, which is connected rigidly to the shaft of the device. As mentioned, disc 12 is connected to two radial sets of ferromagnetic rectangular stacks 14,15. The stacks of set 14 pass between legs 2,3 as the rotor rotates. The stacks of set 15 pass through legs 3,4. The number of stacks in each set is half the number of cores. Between sets 14,15 there is an angular offset such that when set 15 are between the legs of even-numbered core and in a (for example) N-S direction, the stacks 14 are between the legs of odd-numbered cores in the opposite magnetic direction, S-N. After a rotation through one pole pitch angle, the direction of the magnetic flux around the half windings will be changed.

That is to say, the flux through distribution switch 11 has alternating directions, upwards then downwards then upwards etc. The magnets are 'working' at all times, which is an advantage of the invention.

Particular advantage of the E-core embodiment over other TFM designs is its optimal magnetic behavior: this design enables reaching optimal magnetic resistance to (self-induction) leakage fluxes, as seen in FIG. 3: The leakage flux self-induced around the half-windings 9,10 faces rather high magnetic resistance since its magnetic lines can't penetrate the magnet, and must pass more than half of their way through air.

4. L-Switch Embodiment

Figure 4:
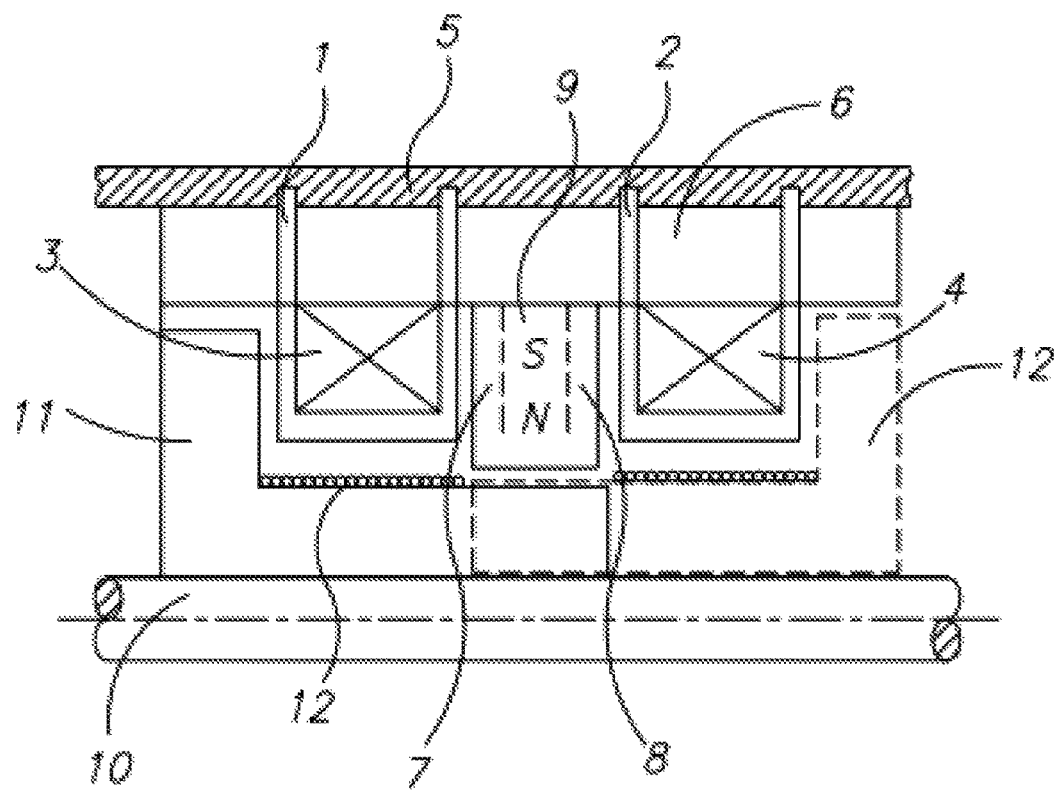
FIG. 4 shows an embodiment employing L-shaped magnetic flux distribution switches.

A further embodiment of the invention utilizing an L-shaped laminated steel stack as a magnetic flux distribution switch is shown in FIG. 4.

The phase module of the stator comprises two bobbins 1,2 (which in this embodiment are also used for winding holding, for cores distribution and for torque passing from stator cores to housing drum) each holding a phase half-winding 3,4. The bobbins are rigidly attached to the housing 5. Stator flux conduction elements are employed, for example comprising laminated steel stacks 6 in the form of parallelepiped or T, parallel to the axis of rotation.

Magnetic excitation elements such as radially directed permanent magnets 9 are attached to the middle of said stator stacks, and distributed uniformly on the circumference. Stiffening ribs 7,8 of inner bobbins' cheeks hold the permanent magnets 9. One end of the magnet 9 is connected to the stack 6, and the other end faces the axis of the machine. The rotor has two groups of flux distribution switches in the form of L-shaped stacks 11,12, rigidly attached to the shaft 10 and uniformly distributed. The radial part of the L-switch nearly touches the stacks 6, and the second part is parallel to the axis, almost touching the magnet 9 as seen in FIG. 4.

The L-switches of one bobbin may be shifted relative to those of the second bobbin by one angular pole pitch. In the plane of FIG. 4 the L-switch 11 of the first bobbin 1 is in the plane of the figure, hence the L-switch 12 of the second bobbin 2 is shown by a dotted line.

Several ways of fixing the L-shaped distribution switches to withstand centrifugal forces are possible, including the use of a ring or band of Kevlar 12 as shown.

During the rotor's rotation, the L-switches change the direction of the magnetic flux around the half-windings 3,4. Thus, this machine does not include inactive magnets and has a smaller possible size for a given power than a conventional electrical machine, particularly TFM.

Particular advantage of the L-switch embodiment over other TFM designs is its optimal magnetic behavior: Such a form of a flux distribution switch enables reaching maximal magnetic resistance to (self-induction) leakage fluxes, as seen in FIG. 4:

The leakage flux self-induced around half-winding 4 that is not embraced by L-switch at this moment faces high magnetic resistance since its magnetic lines must pass ¾ of their way through air.

The leakage flux self-induced around half-winding 3 that is embraced by L-switch at this moment also faces rather high magnetic resistance since its magnetic lines can't penetrate the magnet, and must pass ¼ of their way through air.

General Features of the Embodiments

Implementatios: In single phase embodiments of ITFM using permanent magnets, only a generator (and not a motor) can be implemented. Alternatively, ITFM may be implemented as multiple phase generators or motors using further sets of windings, 245 cores, and magnets located so as to produce appropriate phase offsets. This arrangement allows implementation of a device with an internal rotor such as that shown in FIG. 4 or with an external rotor.

1. Bobbins: Bobbins are used in the invention for three separate purposes simultaneously: for holding the windings, for stator-cores distribution, and for transferring torque from stator cores to the housing drum.

The combination of the known bobbin component introduces brand new and uniform purposes. The introduction of said component results in interaction with other components resulting in synergy.

2. Materials: All of the parts of the magnetic circuits are designet to eliminate eddy currents.

Devices based on the current invention may find use in many applications, such as electric motors for cars as main power or hubmotors, not requiring transmission; electric motors for trains; compressor motors; generators—wind turbines, shaft generators, power generators and the like.

Any term that has been defined above and used in the claims, should be interpreted according to this definition.

The reference numbers in the claims are not a part of the claims, but rather used for facilitating the reading thereof. These reference numbers should not be interpreted as limiting the claims in any form.

The foregoing embodiments of the invention have been described and illustrated in conjunction with systems and methods thereof, which are meant to be merely illustrative, and not limiting. Furthermore just as every particular reference may embody particular methods/systems, yet not require such, ultimately such teaching is meant for all expressions notwithstanding the use of particular embodiments.

The invention claimed is:

1. A transverse flux electrical motor or generator, comprising:
   a rotor shaft and a stator;
   stator based phase half-windings concentric with an axis of said transverse flux electrical motor or generator;
   a plurality of core sets, each core set comprised of at least two cores comprised of a plurality of core elements, said plurality of core sets being distributed on a circumference of the stator, each core forming an incomplete magnetic circuit by partially circumscribing one of said stator phase half-windings;
   a plurality of magnetic excitation elements in-between of said phase half-windings, each of said plurality of magnetic excitation elements arranged to have alternate polarity relative to an adjacent magnetic excitation element thereof,
   wherein, at least one portion of said core elements, which is adjacent to each of said plurality of magnetic excitation elements functions as a magnetic flux distribution switch,
   wherein each of said magnetic flux distribution switches is configured such that one of said incomplete magnetic circuits is closed, continuously, periodically, and alternately upon a rotation of said rotor shaft, thereby switching a direct excitation magnetic flux to different directions periodically and alternately around each of said phase half-windings, one after another, thus enabling continuous utilization of all of said plurality of magnetic excitation elements without idle breaks, wherein, each of said plurality of core sets utilizes a single magnetic excitation element arranged so its polarity is in a largely identical direction with the flow of flux therethrough, and wherein, when complete, each magnetic circuit contains a single magnetic excitation element.

2. The electrical motor or generator of claim 1, further comprising bobbins adapted to hold said phase half-windings, to distribute said plurality of core sets, and to transfer torque.

3. The electrical motor or generator of claim 1, wherein said stator is an outer stator circumscribing said rotor, which is an inner rotor.

4. The electrical motor or generator of claim 1, wherein, said at least two cores are two respectfully facing sets of C shaped cores uniformly distributed on said stator's circumference and are shifted by one angular pole pitch with regard to each other, wherein said stator phase half-windings are in the form of azimuthally disposed rings threading said C shaped cores, wherein, said rotor shaft is attached to at least one disc located between said sets of C shaped cores, and wherein said at least one disc bears said plurality of magnetic excitation elements between two magnetic flux distribution switches.

5. The electrical motor or generator of claim 1, wherein said rotor shaft is attached to two sets of said plurality of magnetic flux distribution switches, which are shifted by one angular pole pitch with respect to each other and have an L shape having radial and axial portions with respect to the rotor shaft, wherein said axial portions partially overlap each-other and face each other, wherein said plurality of core elements are a plurality of axial, uniformly distributed upon said stator, ferromagnetic laminated stacks, wherein said plurality of core elements are attached to one of said plurality of magnetic excitation elements, placed radially in the middle of said laminated stacks, and between said plurality of phase half-windings which are located between said stacks, said magnetic flux distribution switches, and said excitation elements.

6. The electrical motor or generator of claim 1, wherein one of said plurality of core elements is radial and is attached to a plurality of axial core elements that are parallel to each other, wherein, one of said plurality of magnetic excitation elements is positioned in one of said axial core elements that is in-between said plurality of stator based phase half-windings, wherein, said at least one set of plurality of magnetic flux distribution switches is one set of radial magnetic flux distribution switches and is located on the end of said axial core element that is in-between of said plurality of stator based phase half-windings, wherein, a disc is attached perpendicularly to said rotor shaft, wherein, axial ferromagnetic stacks are attached to said disc, and wherein said ferromagnetic stacks are divided to two sets, uniformly distributed on the rotor, and shifted by one angular pole pitch regarding each other, so that a first set interacts magnetically with middle and lower axial core elements, and alternately, a second set interacts magnetically with the upper and middle axial core elements.

7. The electrical motor or generator of claim 1, wherein ferromagnetic material in said plurality of cores and plurality of magnetic flux distribution switches consist of laminated steel stacks disposed so as to reduce eddy currents therethrough.

8. The electrical motor or generator of claim 1, wherein said magnetic excitation element is effected by electromagnets using DC winding.

9. The electrical motor or generator of claim 1, wherein said stator is an inner stator circumscribed by a rotor which is an outer rotor.

10. The electrical motor or generator of claim 1, wherein said electrical motor or generator is implemented in a multi-phase machine.

* * * * *